US011899851B2

(12) United States Patent
Ito et al.

(10) Patent No.: US 11,899,851 B2
(45) Date of Patent: Feb. 13, 2024

(54) INFORMATION PROCESSING APPARATUS AND CONTROL METHOD

(71) Applicants: Yoshinori Ito, Kanagawa (JP); Masaru Nishiyama, Kanagawa (JP); Yuichi Sone, Kanagawa (JP)

(72) Inventors: Yoshinori Ito, Kanagawa (JP); Masaru Nishiyama, Kanagawa (JP); Yuichi Sone, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/300,399

(22) Filed: Apr. 14, 2023

(65) Prior Publication Data
US 2023/0400932 A1    Dec. 14, 2023

(30) Foreign Application Priority Data

Jun. 7, 2022   (JP) ................................ 2022-092131

(51) Int. Cl.
*G06F 3/023*   (2006.01)
*G09G 3/00*    (2006.01)

(52) U.S. Cl.
CPC ............. *G06F 3/023* (2013.01); *G09G 3/035* (2020.08); *G09G 2320/0613* (2013.01); *G09G 2320/0686* (2013.01); *G09G 2354/00* (2013.01)

(58) Field of Classification Search
CPC ..................... G06F 3/023; G09G 3/035; G09G 2320/0613; G09G 2320/0686; G09G 2354/00

(Continued)

(56) References Cited

U.S. PATENT DOCUMENTS

2010/0207888 A1*   8/2010   Camiel ................. G06F 1/1643
                                                              345/168
2017/0060260 A1    3/2017   Wang et al.
(Continued)

FOREIGN PATENT DOCUMENTS

JP      2004038332 A    2/2004
JP      2018-013850 A   1/2018
(Continued)

OTHER PUBLICATIONS

"How to connect the keyboard via Bluetooth communication <dynabook KIRA L93, LZ93 series Windows 10>"; Dynabook, Inc.; published May 17, 2016; Search date: Sep. 1, 2023; with translation; https://dynabook.com/assistpc/faq/pcdata2/017437.htm (13 pages).

(Continued)

*Primary Examiner* — Amare Mengistu
*Assistant Examiner* — Gloryvid Figueroa-Gibson
(74) *Attorney, Agent, or Firm* — Osha Bergman Watanabe & Burton LLP

(57) ABSTRACT

An information processing apparatus has a first display mode in which the entire screen region of a display is controlled to be displayed as a display region, and a second display mode in which a partial screen region excluding the predetermined screen region in the screen region of the display is controlled to be displayed as a display region, and performs a placement detection process of detecting placement of an external keyboard on the predetermined screen region in the screen region of the display, a communication control process of performing a communicative connection with the keyboard, and a display mode control process of controlling switching between the first display mode and the second display mode on the basis of the placement detection process and the communication control process.

10 Claims, 9 Drawing Sheets

(58) Field of Classification Search
USPC .......................................................... 345/168
See application file for complete search history.

(56) References Cited

U.S. PATENT DOCUMENTS

2019/0042040 A1* 2/2019 Kumar .................. G06F 3/0412
2020/0333852 A1* 10/2020 Smith .................... G06F 1/1666

FOREIGN PATENT DOCUMENTS

| JP | 2022018572 A | 1/2022 |
| JP | 2022070081 A | 5/2022 |
| JP | 2022074748 A | 5/2022 |

OTHER PUBLICATIONS

"Lenovo ThinkPad X1 Fold Gen 1 Review (4 months later)"; Dove Computer Solutions Ltd; published May 26, 2022; Search date: Jun. 5, 2023; https://web.archive.org/web/20220526221340/https://www.youtube.com/watch?v=yBkK6CdSdul (3 pages).

* cited by examiner

INFORMATION PROCESSING APPARATUS AND CONTROL METHOD

CROSS-REFERENCE TO RELATED APPLICATIONS

This application claims priority to Japanese Patent Application No. 2022-92131 filed on Jun. 7, 2022, the contents of which are hereby incorporated herein by reference in their entirety.

BACKGROUND OF THE INVENTION

Field of the Invention

The present invention relates to an information processing apparatus and a control method.

Description of the Related Art

In recent years, an information processing apparatus in which a foldable flexible display (display unit) is provided over a first chassis and a second chassis to be bendable according to rotation between the first chassis and the second chassis is also disclosed (refer to, for example, Japanese Unexamined Patent Application Publication No. 2018-13850). In such a case where one display is provided over the first chassis and the second chassis, the information processing apparatus may be used as a one-screen mode with one display, and may also be used as a two-screen mode in which one display is divided into a screen region on the first chassis side and a screen region on the second chassis side in a pseudo manner.

Since the information processing apparatus as described above has one display provided over the first chassis and the second chassis, it is common that the information processing apparatus is not provided with a keyboard, but has two screens. However, an external keyboard is placed on one screen and the other screen is used as a display screen in a two-screen mode, so that a usage form can be the same as that of a laptop personal computer (PC) equipped with a keyboard. In this case, in the two-screen mode, a user's convenience is improved by automatically switching a screen mode to a screen mode in which the screen region on the side on which the external keyboard is placed is controlled to be displayed black, and the screen region on the other side is controlled to be half the size of the screen in the one-screen mode (hereinafter, referred to as a "half-screen mode"). However, there is a case where display on the display cannot be appropriately controlled only by detecting the placement of the external keyboard.

SUMMARY OF THE INVENTION

One or more embodiments of the invention provide an information processing apparatus and a control method for appropriately controlling display on a display when an external keyboard is used.

According to a first aspect of the present invention, there is provided an information processing apparatus including a display; a memory that temporarily stores display data to be displayed on the display; and a processor that performs control when the display data stored in the memory is displayed on the display, in which the processor performs a placement detection process of detecting placement of an external keyboard on a predetermined screen region in a screen region of the display, a communication control process of performing a communicative connection with the keyboard, and a display mode control process of controlling switching between a first display mode and a second display mode on the basis of the placement detection process and the communication control process, the first display mode being a display mode in which the entire screen region of the display is controlled to be displayed as a display region, and the second display mode being a display mode in which a partial screen region of the display excluding the predetermined screen region in the screen region of the display is controlled to be displayed as a display region.

In the information processing apparatus, in the display mode control process, the processor may control switching to the second display mode in a case where the placement of the keyboard on the predetermined screen region is detected on condition that the communicative connection with the keyboard is established, and control switching to the first display mode instead of switching to the second display mode when the communicative connection with the keyboard is not established even in a case where the placement of the keyboard on the predetermined screen region is detected.

In the information processing apparatus, in the display mode control process, the processor may control switching to the first display mode in a case where the placement of the keyboard on the predetermined screen region is not detected.

In the information processing apparatus, the processor may further perform a display information control process of displaying, on the display, a pop-up screen including information indicating that the communicative connection with the keyboard is not established when the communicative connection with the keyboard is not established even in a case where the placement of the keyboard on the predetermined screen region is detected.

In the information processing apparatus, the processor may further perform a display information control process of displaying, on the display, a pop-up screen on which a user is allowed to perform an operation of giving an instruction for the communicative connection with the keyboard when the communicative connection with the keyboard is not established even in a case where the placement of the keyboard on the predetermined screen region is detected.

In the information processing apparatus, in a case where the pop-up screen is displayed through the display information control process, the processor may display the pop-up screen in a screen region other than the predetermined screen region in the screen region of the display in the first display mode.

In the information processing apparatus, the processor may further perform a display information control process of displaying, on the display, a pop-up screen including information indicating that the communicative connection with the keyboard is not established after controlling switching to the second display mode through the display mode control process when the communicative connection with the keyboard is not established even in a case where the placement of the keyboard on the predetermined screen region is detected, and performs switching to the first display mode through the display mode control process after a certain period of time elapses from a state in which the communicative connection with the keyboard is not established.

In the information processing apparatus, in the communication control process, the processor may perform the communicative connection with the keyboard wirelessly or by wire.

In the information processing apparatus, in a case where the processor controls switching to the second display mode through the display mode control process, the processor may control to display the predetermined screen region black.

In the information processing apparatus, the display may be one foldable display.

In the information processing apparatus, the display may include a plurality of displays.

According to a second aspect of the present invention, there is provided a control method in an information processing apparatus including a display, a memory that temporarily stores display data to be displayed on the display, and a processor that performs control when the display data stored in the memory is displayed on the display, the control method including causing the processor to execute a placement detection step of detecting placement of an external keyboard on a predetermined screen region in a screen region of the display, a communication control step of performing a communicative connection with the keyboard, and a step of controlling switching between a first display mode and a second display mode on the basis of a detection result in the placement detection step and a control result in the communication control step, the first display mode being a display mode in which the entire screen region of the display is controlled to be displayed as a display region, and the second display mode being a display mode in which a partial screen region excluding the predetermined screen region in the screen region of the display is controlled to be displayed as a display region.

According to the above aspects of the present invention, it is possible to appropriately control display on a display when an external keyboard is used.

DETAILED DESCRIPTION OF THE INVENTION

Hereinafter, embodiments of the present invention will be described with reference to the drawings.

First Embodiment

First, a first embodiment will be described.

Figure 1:
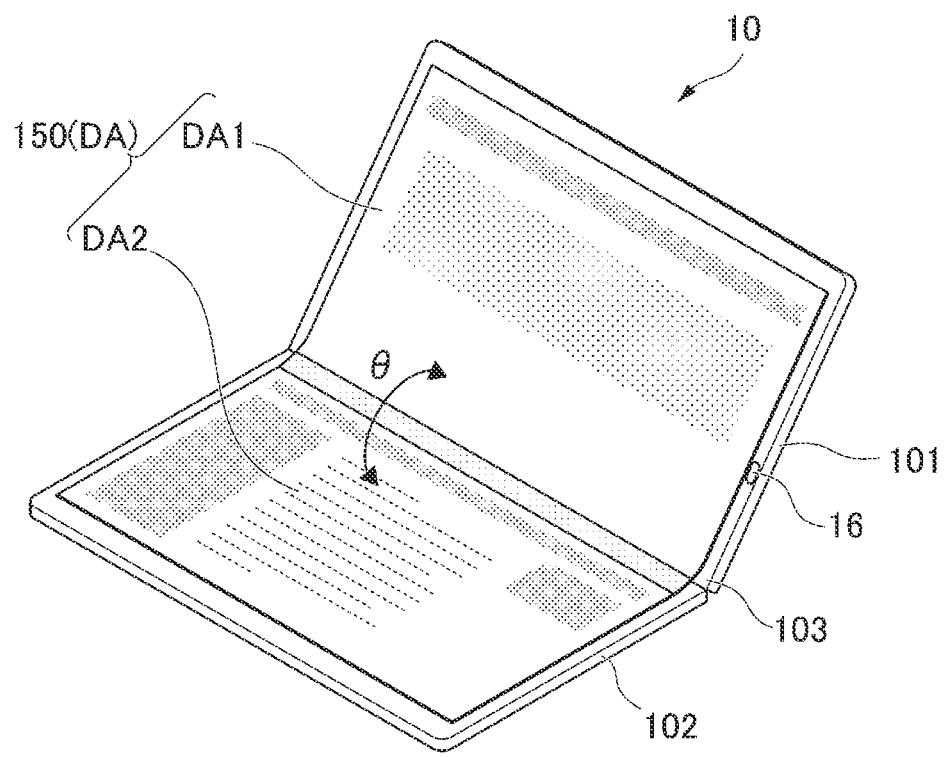
FIG. 1 is a perspective view illustrating an external appearance of an information processing apparatus according to a first embodiment.

FIG. 1 is a perspective view illustrating an external appearance of an information processing apparatus 10 according to the first embodiment. The information processing apparatus 10 according to the first embodiment is a clamshell type (laptop type) personal computer (PC). The information processing apparatus 10 includes a first chassis 101, a second chassis 102, and a hinge mechanism 103. The first chassis 101 and the second chassis 102 are substantially quadrangular plate-shaped (for example, flat plate-shaped) chassis. One of side surfaces of the first chassis 101 and one of side surfaces of the second chassis 102 are coupled (connected) via the hinge mechanism 103, and the first chassis 101 and the second chassis 102 are relatively rotatable around a rotation axis formed by the hinge mechanism 103. A state in which an opening angle θ around the rotation axis of the first chassis 101 and the second chassis 102 is approximately 0° is a state in which the first chassis 101 and the second chassis 102 overlap each other and are closed. A state in which the first chassis 101 and the second chassis 102 are closed will be referred to as a "closed state". In the closed state, surfaces of the first chassis 101 and the second chassis 102 facing each other will be referred to as "inner surfaces", and surfaces opposite to the inner surface will be referred to as "outer surfaces". The opening angle θ can also be said to be an angle formed by the inner surface of the first chassis 101 and the inner surface of the second chassis 102. A state in which the first chassis 101 and the second chassis 102 are opened relative to the closed state will be referred to as an "open state". The open state is a state in which the first chassis 101 and the second chassis 102 are relatively rotated until the opening angle θ becomes larger than a preset threshold value (for example, 10°).

The information processing apparatus 10 includes a camera 16 and a display 150. The camera 16 is provided on the inner surface of the first chassis 101. The display 150 is provided from the inner surface of the first chassis 101 to the inner surface of the second chassis 102. The camera 16 is provided in, for example, an outer portion of a screen region of the display 150 on the inner surface of the first chassis 101, and can image a user or the like present on the side facing the display 150. The display 150 is a flexible display that can be bent according to the opening angle θ due to relative rotation of the first chassis 101 and the second chassis 102 (refer to FIGS. 2 and 3). As the flexible display, an organic EL display or the like is used. The information processing apparatus 10 can not only control to display the entire screen region of the display 150 as one screen region DA, that is, as one screen configuration but also control to display the entire screen region of the display 150 as two divided screen regions such as a first screen region DA1 and a second screen region DA2, that is, as a two-screen configuration. Here, the first screen region DA1 and the second screen region DA2 are screen regions that do not overlap each other. Here, out of the screen regions of the display 150, the screen region corresponding to the inner surface side of the first chassis 101 is the first screen region DA1, and the screen region corresponding to the inner surface side of the second chassis 102 is the second screen region DA2. Hereinafter, a display mode in which the display is controlled as the one-screen configuration will be referred to as a "one-screen mode", and a display mode in which the display is controlled as the two-screen configuration will be referred to as a "two-screen mode".

A touch sensor is provided on the screen region of the display 150. The information processing apparatus 10 can detect a touch operation on the screen region of the display 150. By opening the information processing apparatus 10, a user can visually recognize display of the display 150 provided on the inner surface of each of the first chassis 101 and the second chassis 102, or can perform a touch operation on the display 150, and can thus use the information processing apparatus 10.

Next, a usage form and a screen mode of the information processing apparatus 10 will be described in detail. First, as a usage form of the information processing apparatus 10, there are a state (bent form) in which the first chassis 101 and the second chassis 102 are bent depending on the opening angle θ between the first chassis 101 and the second chassis 102, and a flat state (flat form) in which the first chassis 101 and the second chassis 102 are not bent. In the following description, a state (bent form) in which the first chassis 101 and the second chassis 102 are bent will be simply referred to as a "bent state (bent form)", and a state (flat form) in which the first chassis 101 and the second chassis 102 are not bent will be simply referred to as a "flat state (flat form)". In the bent state (bent form), the display 150 provided over the first chassis 101 and the second chassis 102 is also in a bent state. In the flat state (flat form), the display 150 is also in a flat state.

Figure 2:
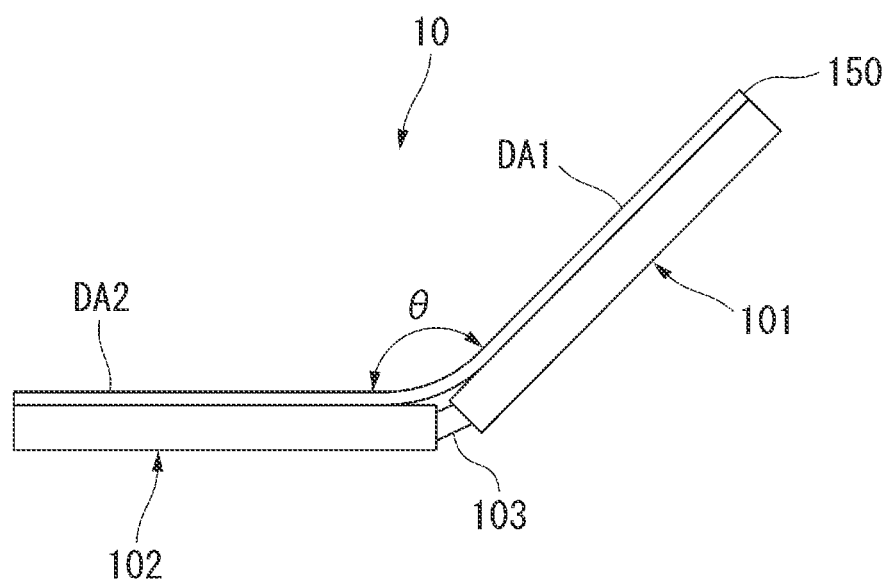
FIG. 2 is a side view illustrating an example of the information processing apparatus in a bent state according to the first embodiment.

FIG. 2 is a side view illustrating an example of the information processing apparatus 10 in the bent state (bent form). The display 150 is disposed over (across) the first chassis 101 and the second chassis 102. The screen region of the display 150 (the screen region DA illustrated in FIG. 1) can be bent with a portion corresponding to the hinge mechanism 103 as a crease, and the screen region on the first chassis 101 side is illustrated as the first screen region DA1 and the screen region on the second chassis 102 side is illustrated as the second screen region DA2 with the crease as a boundary. The display 150 is bent according to rotation (opening angle θ) between the first chassis 101 and the second chassis 102. It is determined whether or not the information processing apparatus 10 is in a bent state (bent form) according to the opening angle θ. As an example, in a case of 10°<θ<170°, it is determined that the information processing apparatus 10 is in a bent state (bent form). This state corresponds to a usage form such as a so-called clamshell mode or book mode.

Figure 3:
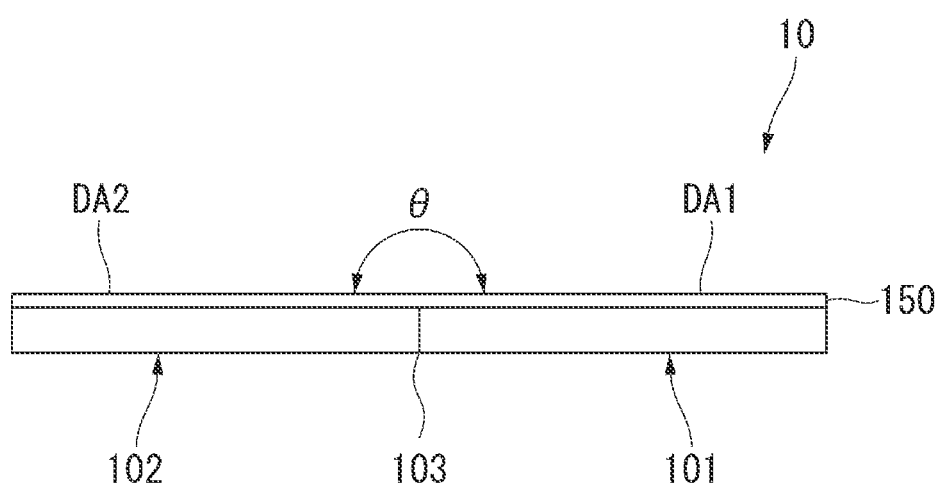
FIG. 3 is a side view illustrating an example of an information processing apparatus in a flat state according to a first embodiment.

FIG. 3 is a side view illustrating an example of the information processing apparatus 10 in a flat state (flat form). It is typically determined that the information processing apparatus 10 is in a flat state (flat form) in a case where the opening angle θ is 180°, but as an example, in a case of 170°≤θ≤180°, it may be determined that the information processing apparatus 10 is in a flat state (flat form). For example, in a case where the opening angle θ between the first chassis 101 and the second chassis 102 is 180°, the display 150 is also in a flat state. This state corresponds to a usage form called a so-called tablet mode.

Next, with reference to FIG. 4, display modes according to various usage forms of the information processing apparatus 10 will be described in detail.

Figure 4:
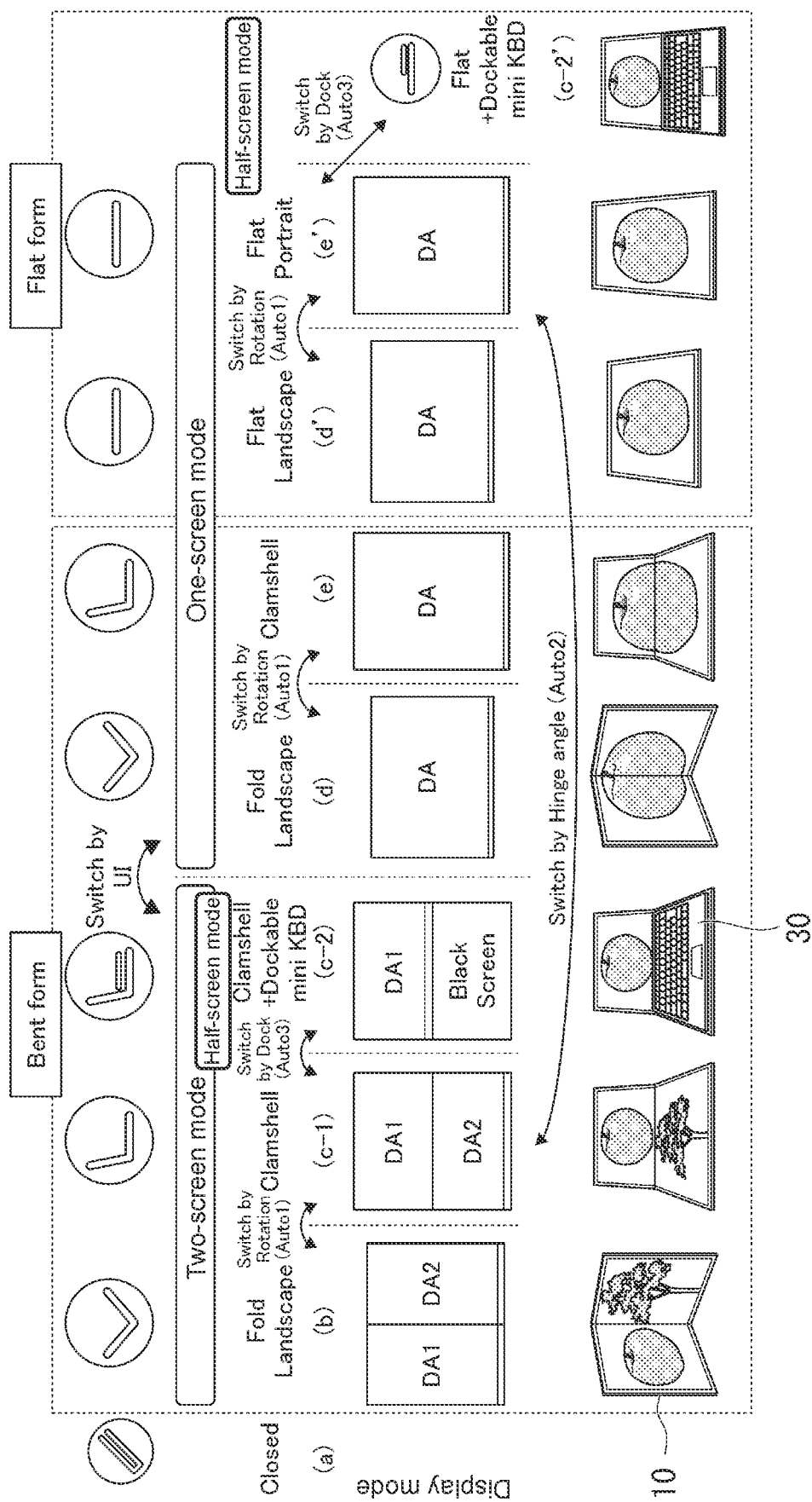
FIG. 4 is a diagram illustrating specific examples of various display modes of the information processing apparatus according to the first embodiment.

FIG. 4 is a diagram illustrating specific examples of various display modes of the information processing apparatus 10 according to the first embodiment. The information processing apparatus 10 has different display modes according to usage forms classified depending on the opening angle θ between the first chassis 101 and the second chassis 102, an attitude (orientation) of the information processing apparatus 10, whether a screen mode is a one-screen mode or a two-screen mode, and the like. One screen will also be referred to as a single screen, and two screens will also be referred to as split screens or dual screens.

The display mode (a) is a display mode when the first chassis 101 and the second chassis 102 are in a closed state (closed) as a usage form. For example, in this closed state, the information processing apparatus 10 is in a standby state such as a sleep state or a hibernation state (hibernation), and the display 150 is in a display-off state. The standby state such as the sleep state or the hibernation state (hibernation) corresponds to S3 or S4 of the power supply state of the system defined by, for example, Advanced Configuration and Power Interface (ACPI).

The display mode (b) is a display mode when a usage form is a bent state (bent form), and a screen mode is a two-screen mode in which display control is performed such that the screen region of the display 150 is divided into two screen regions such as the first screen region DA1 and the second screen region DA2. The orientation of the information processing apparatus 10 is an orientation in which the first screen region DA1 and the second screen region DA2 are arranged horizontally side by side in a vertical orientation. The vertical orientation of the screen region means that the long side of the four sides of the rectangular screen region is in the vertical direction and the short side is in the horizontal direction. In a case where the screen region is in the vertical orientation, a display orientation is also a vertical orientation, and display is performed such that the direction along the long side corresponds to the vertical direction and the direction along the short side corresponds to the horizontal direction. This usage form is a usage form in which left and right pages when a book is opened correspond to the left and right screens, and corresponds to a so-called book mode. This usage form is also referred to as "fold landscape" because a screen region obtained by combining the first screen region DA1 and the second screen region DA2 side by side in a bent state (bent form) is horizontally long.

In this display mode (b), for example, in a normal operation state, the information processing apparatus 10 is in a two-screen display mode in which the first screen region DA1 on the left serves as a primary screen and the second screen region DA2 on the right serves as a secondary screen. In the display mode (b), a correspondence relationship between the first screen region DA1 and the second screen region DA2 and the primary screen and the secondary screen may be reversed.

Similar to the display mode (b), the display mode (c-1) is a display mode when a usage form is a bent state (bent form), and a screen mode is a two-screen mode in which display control is performed such that the screen region of the display 150 is divided into two screen regions such as the first screen region DA1 and the second screen region DA2, but an orientation of the information processing apparatus 10 is different. The orientation of the information processing apparatus 10 is an orientation in which the first screen region DA1 and the second screen region DA2 are arranged vertically side by side in a horizontal orientation. The horizontal orientation of the screen region means that the long side of the four sides of the rectangular screen region is in the horizontal direction and the short side is in the vertical direction. In a case where the screen region is in the horizontal orientation, a display orientation is also a horizontal orientation, and display is performed such that the direction along the long side corresponds to the horizontal direction and the direction along the short side corresponds to the vertical direction. This usage form is one of general usage forms of a clamshell type PC.

In this display mode (c-1), for example, in a normal operation state, the information processing apparatus 10 is in a two-screen display mode in which the first screen region DA1 serves as a primary screen and the second screen region DA2 serves as a secondary screen. In the display mode (c-1), a correspondence relationship between the first screen region DA1 and the second screen region DA2 and the primary screen and the secondary screen may be reversed.

For example, the information processing apparatus 10 detects a change in an attitude (orientation) of the information processing apparatus 10, and thus automatically switches from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when it is detected that the information processing apparatus 10 is rotated rightward from the display mode (b) by a predetermined angle (for example, 45 degrees) or more, the mode is switched to the display mode (c-1). Since the display mode (b) is a state in which the display 150 is rotated 90 degrees to leftward with respect to the display mode (c-1) as illustrated, when it is detected that the information processing apparatus 10 is rotated leftward from the display mode (c-1) by a predetermined angle (for example, 45 degrees) or more, the mode is switched to the display mode (b).

Similar to the display mode (c-1), the display mode (c-2) is a bent state (bent form) and a mode in which an orientation of the information processing apparatus 10 is the same, but is different therefrom in that an external keyboard 30 (dockable mini keyboard (KBD)) that can be placed on the information processing apparatus 10 is placed at a predetermined position. This usage form is a state in which the physical keyboard 30 is connected in a general usage form of a clamshell type PC. For example, in the first embodiment, the keyboard 30 has almost the same size as that of the second screen region DA2 and is configured to be able to be placed on the second screen region DA2. The keyboard 30 may be a keyboard that occupies a smaller area than that of the second screen region DA2. As an example, the keyboard 30 is provided with a magnet inside (end portion) of a bottom surface thereof, and when placed on the second screen region DA2, the keyboard 30 is attracted and fixed to a metal portion of the inner surface end portion of the second chassis 102. As a result, the usage form is the same as that of a conventional clamshell type PC that is originally provided with a physical keyboard. The information processing apparatus 10 and the keyboard 30 are connected by, for example, Bluetooth (registered trademark). In this display mode (c-2), the information processing apparatus 10 controls the second screen region DA2 to be displayed black or turned off because the second screen region DA2 cannot be visually recognized due to the keyboard 30. That is, this display mode (c-2) is a display mode (hereinafter, referred to as a "half-screen mode") in which only one screen region that is a half of the screen region of the display 150 is effective for display, and is a one-screen mode using only the first screen region DA1. That is, the half-screen mode is a display mode in which display control is performed such that a partial screen region (first screen region DA1) excluding the screen region (second screen region DA2) on the side on which the keyboard 30 is placed from the screen region (screen region DA) of the display 150 is used as a screen region.

For example, when the information processing apparatus 10 detects a connection with an external keyboard in the state of the display mode (c-1), the information processing apparatus 10 automatically switches from the display mode (c-1) to the display mode (c-2) (Switch by Dock).

Similar to the display mode (b), the display mode (d) is a bent state (bent form), and a mode in which an orientation of the information processing apparatus 10 is the same, but is different therefrom because display control is performed to provide a one-screen mode in which the entire screen region of the display 150 is used as one screen region DA. This usage form is different from the display mode (b) in that a one-screen mode is provided, but will also be referred to as "fold landscape" because the display mode is a bent state (bent form) and the screen region DA is horizontally long. The screen region DA is in a horizontal orientation, and a display orientation is also a horizontal orientation.

Here, switching the one-screen mode and the two-screen mode in the bent state (bent form) is performed, for example, by a user operation. For example, the information processing apparatus 10 displays an operator as a user interface (UI) capable of switching the one-screen mode and the two-screen mode at any location on the screen, and switches from the display mode (b) to the display mode (d) on the basis of an operation on the operator (Switch by UI). Specific examples of this display mode switching operation will be described later.

Similar to the display mode (c-1), the display mode (e) is a bent state (bent form) and is a mode in which an orientation of the information processing apparatus 10 is the same, but is different therefrom because display control is performed to provide a one-screen mode in which the entire screen region of the display 150 is used as one screen region DA. This usage form is different from the display mode (c-1) in that a one-screen mode is provided, but corresponds to a usage form of a clamshell type PC from a bent state (bent form) and an orientation of the information processing apparatus 10. The screen region DA is in a vertical orientation, and a display orientation is also a vertical orientation.

For example, the information processing apparatus 10 detects a change in an attitude (orientation) of the information processing apparatus 10, and thus automatically changes from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when it is detected that the information processing apparatus 10 is rotated rightward from the state of the display mode (d) by a predetermined angle (for example, 45 degrees) or more, the mode is switched to the display mode (e). Since the display mode (d) is a state in which the display 150 is rotated 90 degrees rightward with respect to the display mode (e) as illustrated, when it is detected that the information processing apparatus 10 is rotated leftward from the state of the display mode (e) by a predetermined angle (for example, 45 degrees) or more, the mode is switched to the display mode (d).

Similar to the display mode (d), the display mode (d') is a one-screen mode, and is a mode in which an orientation of the information processing apparatus 10 is an orientation in which the screen region DA is horizontally long, but is different therefrom in that is a flat state (flat form) is provided. The flat state (flat form) is a state in which the opening angle θ between the first chassis 101 and the second chassis 102 is about 180°. This usage form corresponds to the so-called tablet mode described with reference to FIG. 3, and will also be referred to as "flat landscape" because a flat state (flat form) is provided and the screen region DA is horizontally long. This display mode (d') is different from the display mode (d) only in the opening angle θ between the first chassis 101 and the second chassis 102. Similar to the display mode (d), the screen region DA is in a horizontal orientation, and the display orientation is also in a horizontal orientation.

Similar to the display mode (e), the display mode (e') is a one-screen mode, and is a mode in which an orientation of the information processing apparatus 10 is also the orientation in which the screen region DA is vertically long, but is different therefrom in that a flat state (flat form) is provided. This usage form will also be referred to as "flat portrait" because a flat state (flat form) is provided and the screen region DA is vertically long. This display mode (e') is different from the display mode (e) only in the opening angle θ between the first chassis 101 and the second chassis 102. Similar to the display mode (e), the screen region DA is in a vertical orientation, and a display orientation is also a vertical orientation.

For example, the information processing apparatus 10 detects a change in an attitude (orientation) of the information processing apparatus 10, and thus automatically changes from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when it is detected that the information processing apparatus 10 is rotated rightward from the state of the display mode (d') by a predetermined angle (for example, 45 degrees) or more, the mode is switched to the display mode (e'). Since the display mode (d') is a state in which the display 150 is rotated 90 degrees rightward with respect to the display mode (e') as illustrated, when it is detected that the information processing apparatus 10 is rotated leftward from the state of the display mode (e') by a predetermined angle (for example, 45 degrees) or more, the mode is switched to the display mode (d').

In the display mode (d') and the display mode (e'), the user can operate the UI (operator) described above to switch to the two-screen mode while maintaining a flat state (flat form). For example, when the state of the display mode (d') is switched to the two-screen mode, a display state is the same as that in the display mode (b) in the flat state (flat form). When the state of the display mode (e') is switched to the two-screen mode, a display state is the same as that in the display mode (c-1) in the flat state (flat form).

When the information processing apparatus 10 detects a connection with the keyboard 30 in the state of the display mode (e'), the information processing apparatus 10 automatically switches from the display mode (e') to the display mode (c-2') (Switch by Dock). The display mode (c-2') is a flat state (flat form), and is different from the display mode (c-2) only in the opening angle θ between the first chassis 101 and the second chassis 102. In this display mode (c-2'), the information processing apparatus 10 controls the second screen region DA2 to be displayed black or turned off because the second screen region DA2 cannot be visually recognized due to the keyboard 30. That is, this display mode (c-2') is a half-screen mode in which, as in the display mode (c-2), only one screen region that is a half of the screen region of the display 150 is effective for display.

In a case where the information processing apparatus 10 has detected a change from a flat state (flat form) to a bent state (bent form), the information processing apparatus 10 can be configured to switch from a one-screen mode to a two-screen mode. For example, in a case where a change to a bent state (bent form) in the state of the display mode (d') has been detected on the basis of the opening angle θ between the first chassis 101 and the second chassis 102, the information processing apparatus 10 automatically switches from the display mode (d') to the display mode (b). In a case where a change to a bent state (bent form) in the state of the display mode (e') has been detected on the basis of the opening angle θ between the first chassis 101 and the second chassis 102, the information processing apparatus 10 automatically switches from the display mode (e') to the display mode (c-1).

(Configuration of Information Processing Apparatus 10)

Hereinafter, a specific configuration of the information processing apparatus 10 will be described.

Figure 5:
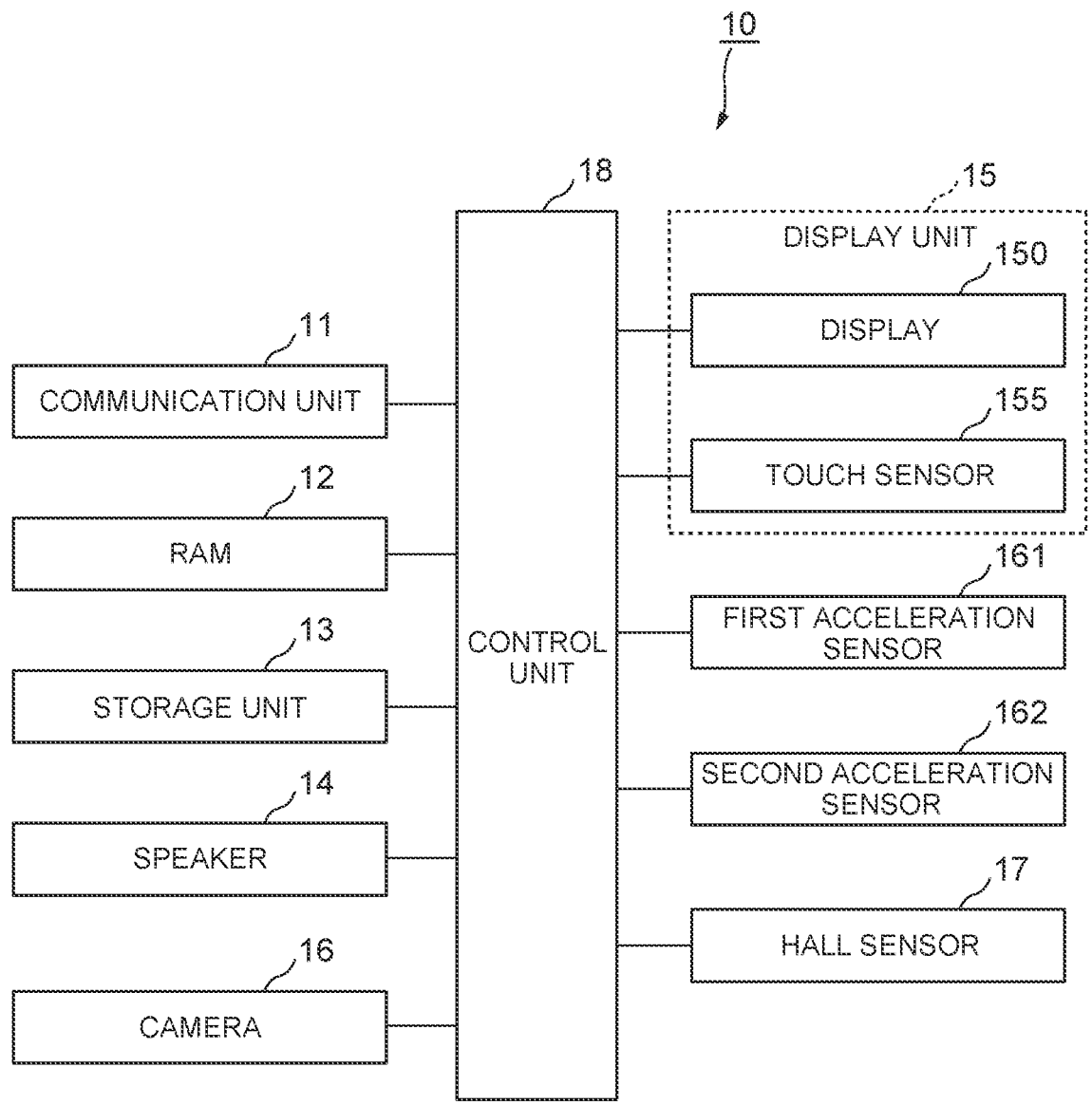
FIG. 5 is a block diagram illustrating an example of a hardware configuration of the information processing apparatus according to the first embodiment.

FIG. 5 is a block diagram illustrating an example of a hardware configuration of the information processing apparatus 10 according to the first embodiment. The information processing apparatus 10 includes a communication unit 11, a random access memory (RAM) 12, a storage unit 13, a speaker 14, a display unit 15, a camera 16, a first acceleration sensor 161, a second acceleration sensor 162, a hall sensor 17, and a control unit 18. These constituents are communicatively connected to each other via a bus or the like.

The communication unit 11 includes digital input/output ports such as a plurality of Ethernet (registered trademark) ports or a plurality of Universal Serial Bus (USB) ports, and a communication device that performs wireless communication such as Bluetooth (registered trademark) or Wi-Fi (registered trademark). For example, the communication unit 11 can communicate with the external keyboard 30 and the like described above by using Bluetooth (registered trademark).

A program or data for processing executed by the control unit 18 is loaded in the RAM 12, and various types of data are stored or deleted as appropriate. For example, the RAM 12 also functions as a video memory (V-RAM) that temporarily stores display data to be displayed on the display 150. As an example, the RAM 12 functions as a video memory of data displayed in the screen region DA when the display 150 is controlled in a one-screen mode. The RAM 12 functions as a video memory of data displayed in the first screen region DA1 and the second screen region DA2 when the display 150 is controlled in a two-screen mode. The RAM 12 functions as a video memory of data displayed in the first screen region DA1 when the display 150 is controlled in the half-screen mode. Since the RAM 12 is a volatile memory, the data is not stored when the power supply to the RAM 12 is stopped. The data that needs to be stored when the supply of power to the RAM 12 is stopped is transferred to the storage unit 13.

The storage unit 13 includes one or more of a solid state drive (SSD), a hard disk drive (HDD), a read only memory (ROM), a Flash-ROM, and the like. For example, the storage unit 13 stores a basic input output system (BIOS) program and setting data, an operating system (OS), a program of an application running on the OS, various data used in the application, and the like.

The speaker 14 outputs electronic sounds, voices, or the like.

The display unit 15 includes a display 150 and a touch sensor 155. As described above, the display 150 is a flexible display that can be bent according to the opening angle θ due to relative rotation of the first chassis 101 and the second chassis 102. The display 150 performs display corresponding to each display mode described with reference to FIG. 4, according to the control of the control unit 18. The touch sensor 155 is provided on the screen of the display 150, and detects a touch operation with respect to the screen. For example, the touch sensor 155 detects a touch operation on the screen region DA in the one-screen mode. The touch sensor 155 detects a touch operation on one or both of the first screen region DA1 and the second screen region DA2 in the two-screen mode. The touch operation includes a tap operation, a slide operation, a flick operation, a swipe operation, a pinch operation, and the like. The touch sensor 155 detects a touch operation and outputs operation information based on the detected operation to the control unit 18.

The camera 16 includes a lens, an imaging element, and the like. The camera 16 captures an image (a still image or a moving image) according to the control of the control unit 18, and outputs data of the captured image.

The first acceleration sensor 161 is provided inside the first chassis 101, and detects an orientation of the first chassis 101 and a change in the orientation. For example, assuming that a direction parallel to the longitudinal direction of the first screen region DA1 is an X1 direction, a direction parallel to the lateral direction is a Y1 direction, and a direction perpendicular to the X1 direction and the Y1 direction is a Z1 direction, the first acceleration sensor 161 detects respective accelerations in the X1 direction, the Y1 direction, and the Z1 direction, and outputs the detection results to the control unit 18.

The second acceleration sensor 162 is provided inside the second chassis 102, and detects an orientation of the second chassis 102 and a change in the orientation. For example, assuming that a direction parallel to the longitudinal direction of the second screen region DA2 is an X2 direction, a direction parallel to the lateral direction is a Y2 direction, and a direction perpendicular to the X2 direction and the Y2 direction is a Z2 direction, the second acceleration sensor 162 detects respective accelerations in the X2 direction, the Y2 direction, and the Z2 direction, and outputs the detection results to the control unit 18.

The hall sensor 17 is provided to detect a connection of the keyboard 30. For example, when the keyboard 30 is placed on the second screen region DA2 of the second chassis 102, a magnetic field changes due to approaching of the magnet provided inside the bottom surface of the keyboard 30, and a detected value (output value) from the hall sensor 17 changes. That is, the hall sensor 17 outputs different detection results depending on whether or not the keyboard 30 is placed.

The control unit 18 includes a processor such as a central processing unit (CPU), a graphic processing unit (GPU), or a microcomputer, and realizes various functions by the processor executing programs (various programs such as a BIOS, an OS, and applications running on the OS) stored in the storage unit 13 or the like. For example, the control unit 18 detects an attitude (orientation) of the information processing apparatus 10 on the basis of the detection results from the first acceleration sensor 161 and the second acceleration sensor 162. The control unit 18 detects, on the basis of the detection results from the first acceleration sensor 161 and the second acceleration sensor 162, whether the information processing apparatus 10 is in an open state, a closed state, or whether the information processing apparatus 10 is in a bent state (bent form) or a flat state (flat form) in the open state, or the like. The control unit 18 detects a connection of the keyboard 30 on the second screen region DA2. The control unit 18 controls switching of the display modes illustrated in FIG. 4 on the basis of the detected attitude (orientation) and state of the information processing apparatus 10, whether or not the keyboard 30 is connected, and the like.

(Method of Detecting Connection with Keyboard 30)

Here, a method of detecting a connection with the keyboard 30 that triggers switching to the half-screen mode will be described. The control unit 18 detects a physical connection between the information processing apparatus 10 and the keyboard 30 by detecting placement of the keyboard 30 on the second screen region DA2 by using the hall sensor 17. However, the control unit 18 does not ascertain whether or not the information processing apparatus 10 and the keyboard 30 are communicatively connected only by detecting the placement of the keyboard 30 on the second screen region DA2. For example, in a case where the control unit 18 has switched a display mode to the half-screen mode by detecting that the keyboard 30 is placed on the second screen region DA2, there may be a situation in which the keyboard 30 cannot be used because a communicative connection with the keyboard 30 is not established for some reason although a display mode has been switched to the half-screen mode.

Therefore, in the first embodiment, the control unit 18 not only detects placement (physical connection) of the keyboard 30 on the second screen region DA2 by using the hall sensor 17, but also detects a connection with the keyboard 30 by determining whether or not a communicative connection with the keyboard 30 is established via the communication unit 11. That is, the control unit 18 detects the connection with the keyboard 30 on the basis of the presence or absence of placement (physical connection) of the keyboard 30 and the presence or absence of the communicative connection with the keyboard 30, and controls switching between the full-screen mode and the half-screen mode.

Figure 6:
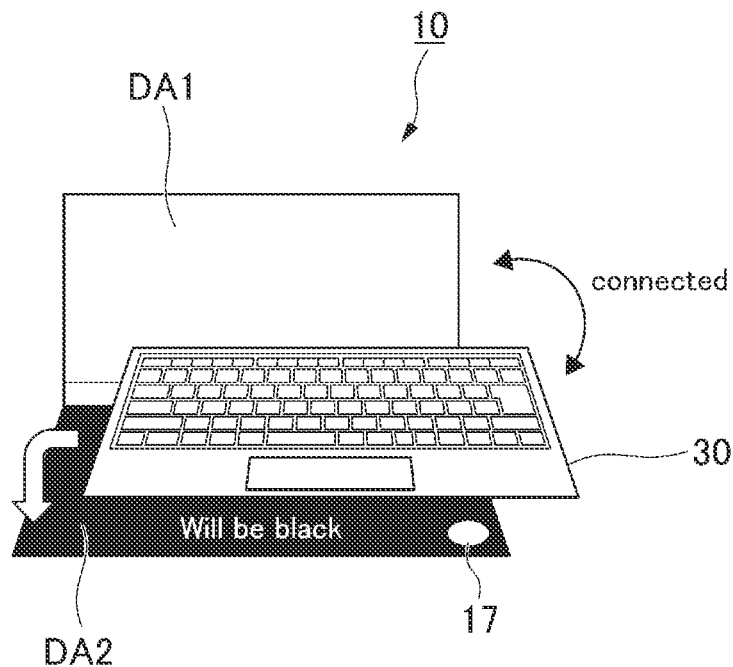
FIG. 6 is a diagram illustrating an example of a state in which a keyboard is connected according to the first embodiment.

FIG. 6 is a diagram illustrating an example of a state in which the keyboard 30 is connected according to the first embodiment. As illustrated in FIG. 6, in a case where the placement of the keyboard 30 on the second screen region DA2 is detected, the information processing apparatus 10 determines that the keyboard 30 is connected on condition that a communicative connection with the keyboard 30 has been established (connected), and switches to the half-screen mode.

Figure 7:
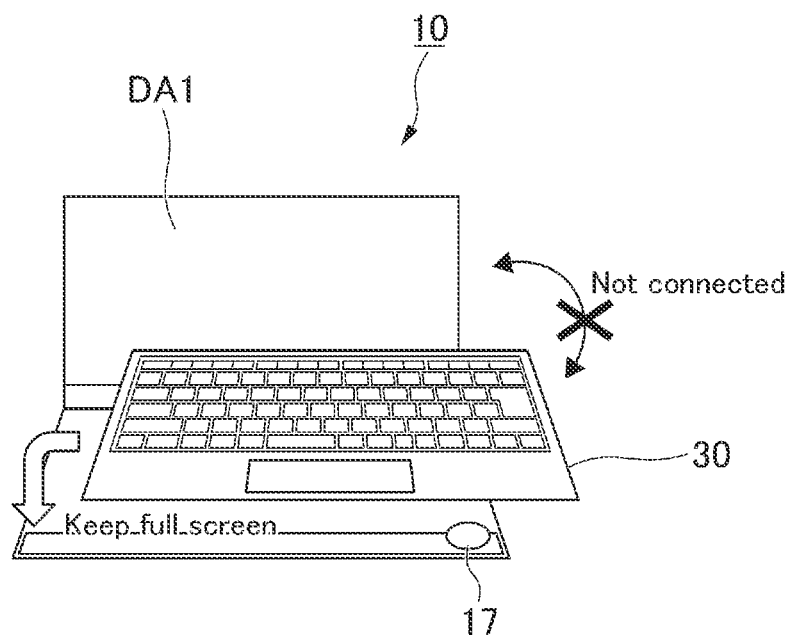
FIG. 7 is a diagram illustrating an example of a state in which a keyboard is not connected according to the first embodiment.

On the other hand, FIG. 7 is a diagram illustrating an example of a state in which the keyboard 30 is not connected according to the first embodiment. Even in a case where the placement of the keyboard 30 on the second screen region DA2 is detected, the information processing apparatus 10 determines that the keyboard 30 is not connected when the communicative connection with the keyboard 30 is not established (not connected), and does not switch to the half-screen mode. In this case, the information processing apparatus 10 is maintained in, for example, a state of the one-screen mode. In a case where a display mode is the two-screen mode before the detection of the placement of the keyboard 30 on the second screen region DA2, the information processing apparatus 10 may be maintained in a state of the two-screen mode, or may switch to the one-screen mode.

The one-screen mode and the two-screen mode are different in that entire screen region of the display 150 is controlled to be displayed as one screen region DA or is controlled to be displayed as two screen regions such as the first screen region DA1 and the second screen region DA2, but are display modes in which the entire screen region of the display 150 is used as a display region. Therefore, the one-screen mode and the two-screen mode will be referred to as a full-screen mode with respect to the half-screen mode.

As described above, the information processing apparatus 10 transitions to the half-screen mode by placing the keyboard 30 on the second screen region DA2 only in a case where communication between the information processing apparatus 10 and the keyboard 30 is established. As a result, even if the keyboard 30 is placed on the second screen region DA2, the information processing apparatus 10 does not switch to the half-screen mode in a state in which a communicative connection with the keyboard 30 is not established, and thus a user can easily recognize that the keyboard 30 is not connected.

Even in a case where placement of the keyboard 30 on the second screen region DA2 is detected, the information processing apparatus 10 may display a pop-up screen including information indicating that a communicative connection with the keyboard 30 is not established when the communicative connection with the keyboard 30 is not established.

Figure 8:
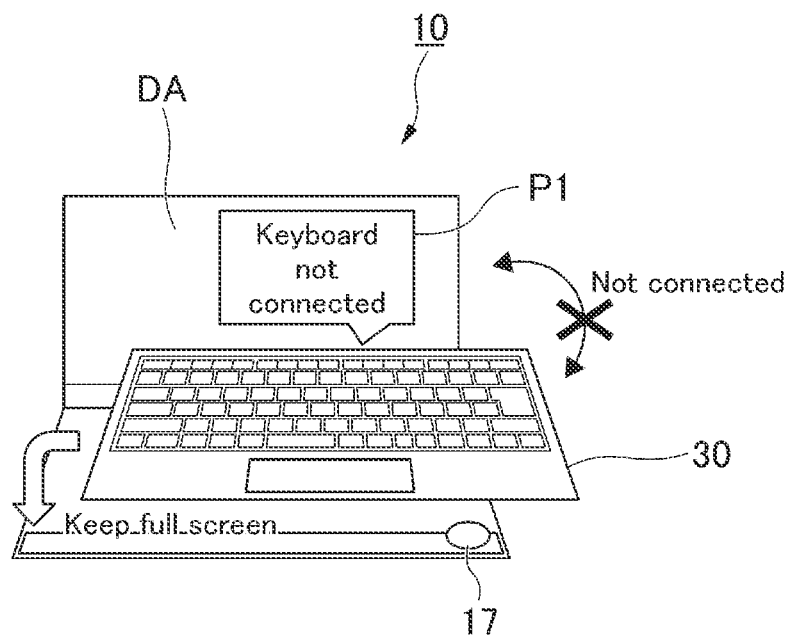
FIG. 8 is a diagram illustrating a first example of a pop-up screen according to the first embodiment.

FIG. 8 is a diagram illustrating a first example of a pop-up screen according to the first embodiment. On an illustrated pop-up screen P1, text indicating that the keyboard 30 is not communicatively connected is displayed. Instead of or in addition to the text, a diagram or a picture indicating that the keyboard 30 is not communicatively connected may be used.

The information processing apparatus 10 may display a pop-up screen on which a user can perform an operation for giving an instruction for communicative connection with the keyboard 30 when the communicative connection with the keyboard 30 is not established even in a case where the placement of the keyboard 30 on the second screen region DA2 is detected. The pop-up screen may be displayed while the full-screen state is maintained as shown in FIG. 8, or the pop-up screen may be displayed after switching to the half-screen mode as shown in FIG. 6.

Figure 9:
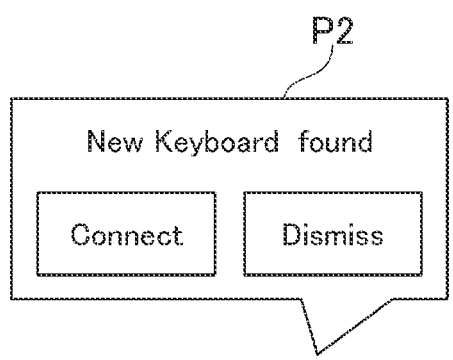
FIG. 9 is a diagram illustrating a second example of a pop-up screen according to the first embodiment.

FIG. 9 is a diagram illustrating a second example of a pop-up screen according to the first embodiment. An illustrated pop-up screen P2 is an example of an operation screen on which a user can perform an operation for giving a communicative connection with the keyboard 30. For example, in a case where the information processing apparatus 10 is communicatively connected to the keyboard 30 by using Bluetooth (registered trademark), a swift pair displayed when the keyboard 30 is not paired is displayed as the pop-up screen P2.

In a case where the pop-up screen P1 or the pop-up screen P2 is displayed, the information processing apparatus 10 displays the pop-up screen P1 or the pop-up screen P2 in a screen region other than a screen region on which the keyboard 30 is placed, regardless of whether a display mode is the one-screen mode or the two-screen mode. Consequently, it is possible to prevent the pop-up screen P1 or the pop-up screen P2 from being hidden by the keyboard 30 and becoming invisible.

(Functional Configuration of Control Unit 18)

Next, in the information processing apparatus 10, a functional configuration related to a half-screen mode control process in which the control unit 18 detects a connection with the keyboard 30 to switch a display mode to the half-screen mode will be described.

Figure 10:
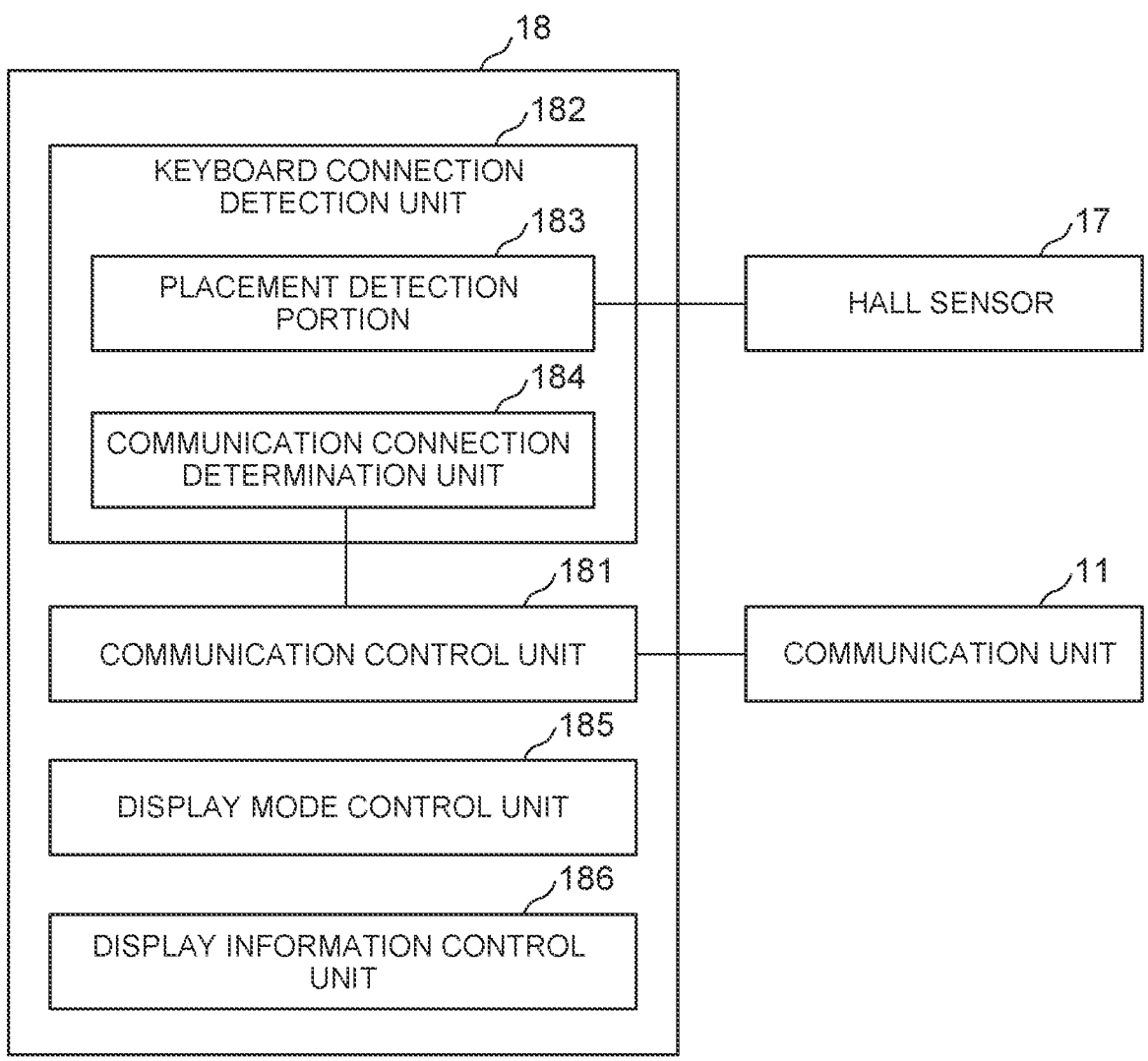
FIG. 10 is a block diagram illustrating an example of a functional configuration related to a half-screen mode control process according to the first embodiment.

FIG. 10 is a block diagram illustrating an example of a functional configuration related to the half-screen mode control process according to the first embodiment.

The control unit 18 includes a communication control unit 181, a keyboard detection processing unit 182, a display mode control unit 185, and a display information control unit 186. The communication control unit 181 controls communication with an external device and apparatus performed via the communication unit 11. For example, the communication control unit 181 makes a communicative connection with the external keyboard 30, and acquires an operation signal according to a user's operation on the keyboard 30.

The keyboard detection processing unit 182 detects a connection with the keyboard 30. For example, the keyboard detection processing unit 182 includes a placement detection portion 183 and a communicative connection determination portion 184. The placement detection portion 183 uses the hall sensor 17 to detect placement of the keyboard 30 on the second screen region DA2 in the screen region DA of the display 150.

In a case where the placement of the keyboard 30 on the second screen region DA2 is detected by the placement detection portion 183, the communicative connection determination portion 184 determines whether or not a communicative connection is established with the keyboard 30 via the communication unit 11. For example, the communicative connection determination portion 184 determines whether or not a communicative connection with the keyboard 30 is established via the communication unit 11 on the basis of whether or not a communicative connection with the keyboard 30 is established by the communication control unit 181.

The display mode control unit 185 controls switching of the respective display modes illustrated in FIG. 4. For example, the display mode control unit 185 controls whether or not a display mode transitions to the half-screen mode on the basis of a detection result from the placement detection portion 183 and a determination result from the communicative connection determination portion 184.

Specifically, in a case where it is detected that the keyboard 30 is placed on the second screen region DA2, the display mode control unit 185 controls switching to the half-screen mode on condition that the communicative connection with the keyboard 30 is established. On the other hand, the display mode control unit 185 does not control to switch a display mode to the half-screen mode when the communicative connection with the keyboard 30 is not established even in a case where the placement of the keyboard 30 on the second screen region DA2 is detected.

Even in a case where it is detected that the keyboard 30 is placed on the second screen region DA2, when a communicative connection with the keyboard 30 is not established, the display mode control unit 185 maintains a display mode (full-screen mode) before the placement of the keyboard 30 on the second screen region DA2 is detected. For example, the display mode control unit 185 may maintain the one-screen mode in a case where the display mode before the placement of the keyboard 30 on the second screen region DA2 is detected is the one-screen mode, and maintain the two-screen mode in a case where the display mode is the two-screen mode. The display mode control unit 185 may switch the display mode to the one-screen mode regardless of a display mode before the placement of the keyboard 30 on the second screen region DA2 is detected.

In a case where the placement of the keyboard 30 on the second screen region DA2 is not detected, the display mode control unit 185 maintains the previous display mode (the one-screen mode or the two-screen mode).

Even in a case where it is detected that the keyboard 30 is placed on the second screen region DA2, when the communicative connection with the keyboard 30 is not established, the display information control unit 186 displays the pop-up screen P1 (refer to FIG. 8) including information indicating the communicative connection with the keyboard 30 is not established on the display 150.

Even in a case where it is detected that the keyboard 30 is placed on the second screen region DA2, when the communicative connection with the keyboard 30 is not established, the display information control unit 186 may display the pop-up screen P2 (refer to FIG. 9) on which a user can perform an operation of giving an instruction for a communicative connection with the keyboard 30 on the display 150.

Here, in a case where the pop-up screen P1 or the pop-up screen P2 is displayed, the display information control unit 186 displays the pop-up screen P1 or the pop-up screen P2 in a screen region (that is, the first screen region DA1) other than the second screen region DA2 on which the keyboard 30 is placed in the screen region DA of the display 150.

(Operation in Half-Screen Mode Control Process)

Next, an operation in the half-screen mode control process executed by the control unit 18 will be described.

Figure 11:
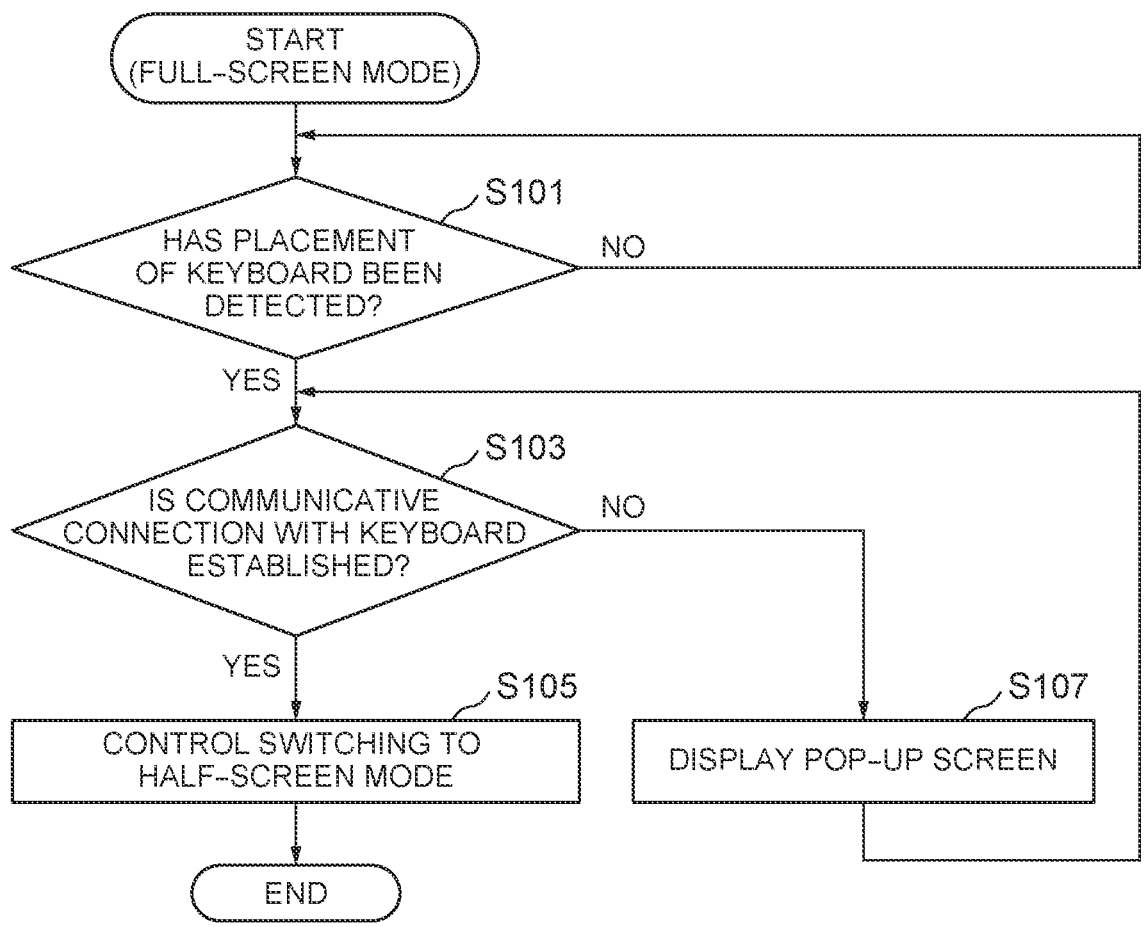
FIG. 11 is a flowchart illustrating an example of a half-screen mode control process according to the first embodiment.

FIG. 11 is a flowchart illustrating an example of the half-screen mode control process according to the first embodiment. Here, an operation in the control process in a case of switching the full-screen mode to the half-screen mode will be described.

(Step S101) The control unit 18 uses the hall sensor 17 to determine whether or not placement of the keyboard 30 on the second screen region DA2 in the screen region DA of the display 150 has been detected. In a case where the control unit 18 determines that the placement of the keyboard 30 has been detected (YES), the control unit 18 proceeds to the process in step S103. On the other hand, in a case where the control unit 18 determines that the placement of the keyboard 30 has not been detected (NO), the control unit 18 performs the process in step S101 again.

(Step S103) The control unit 18 determines whether or not a communicative connection with the keyboard 30 is established via the communication unit 11. In a case where the control unit 18 determines that the communicative connection with the keyboard 30 is established (YES), the flow proceeds to the process in step S105. On the other hand, in a case where the control unit 18 determines that the communicative connection with the keyboard 30 is not established (NO), the flow proceeds to the process in step S107.

(Step S105) The control unit 18 controls to switch the display mode to the half-screen mode, and ends the half-screen mode control process.

(Step S107) The control unit 18 displays the pop-up screen P1 (refer to FIG. 8) or the pop-up screen P2 (refer to FIG. 9) in a screen region (that is, the first screen region DA1) other than the second screen region DA2 on which the keyboard 30 is placed in the screen region DA of the display 150. The flow returns to the process in step S103.

In a case where the control unit 18 displays the pop-up screen in step S107 and then determines in step S103 that the communicative connection with the keyboard 30 has been established, the control unit 18 hides the pop-up screen, then proceeds to the process in step S105, and controls switching to the half-screen mode. In a case where a state in which the keyboard 30 is not placed on the second screen region DA2 is detected after the pop-up screen is displayed in step S107 and before a communicative connection with the keyboard 30 is established, the control unit 18 may hide the pop-up screen and return to the process in step S101.

As described above, the information processing apparatus 10 according to the first embodiment has one foldable display 150, the RAM 12 (an example of a memory) that temporarily stores display data to be displayed on the display 150, and the control unit 18 (for example, an example of a processor such as a CPU, a GPU, or a microcomputer) that performs control when the display data stored in the RAM 12 is displayed on the display 150. The control unit 18 performs a placement detection process of detecting placement of the external keyboard 30 on the second screen region DA2 (an example of a predetermined screen region) in the screen region DA of the display 150, and a communication control process of performing a communicative connection with the keyboard 30. The information processing apparatus 10 has the full-screen mode (an example of a first display mode) in which the entire screen region DA of the display 150 is controlled to be displayed as a display region, and the half-screen mode (an example of a second display mode) in which a partial screen region (for example, the first screen region DA1) excluding the second screen region DA2 in the screen region DA of the display 150 is controlled to be displayed as a display region. The control unit 18 performs a display mode control process of controlling switching between the full-screen mode and the half-screen mode on the basis of the placement detection process and the communication control process. For example, in a case where the control unit 18 detects that the keyboard 30 is placed on the second screen region DA2 in the display mode control process, the control unit 18 performs the display mode control process of controlling to switch a display mode to the half-screen mode on the condition that the communicative connection with the keyboard 30 is established. On the other hand, when the communicative connection with the keyboard 30 is not established even in a case where the placement of the keyboard 30 on the second screen region DA2 is detected in the display mode control process, the control unit 18 controls switching to the full-screen mode instead of switching to the half-screen mode.

As a result, the information processing apparatus 10 switches to the half-screen mode not only in a case where the keyboard 30 is placed on the second screen region DA2 but also in a case where the communicative connection with the keyboard 30 is established, so that there is no situation in which the keyboard 30 cannot be used despite switching to the half-screen mode. Therefore, the information processing apparatus 10 can appropriately control display on the display 150 in a case where the external keyboard 30 is used.

In the display mode control process, the control unit 18 controls switching to the full-screen mode in a case where the placement of the keyboard 30 on the second screen region DA2 is not detected.

Consequently, when the keyboard 30 is not placed on the second screen region DA2, the information processing apparatus 10 is maintained in the full-screen mode without switching to the half-screen mode, and can thus appropriately control display on the display 150.

When a communicative connection with the keyboard 30 is not established even in a case where the placement of the keyboard 30 on the second screen region DA2 is detected, the control unit 18 further performs a display information control process of displaying the pop-up screen P1 (refer to FIG. 8) including information indicating that the communicative connection with the keyboard 30 is not established on the display 150.

As a result, when the keyboard 30 is placed in the second screen region DA2 but the communicative connection with the keyboard 30 is not established, the information processing apparatus 10 enables a user to easily recognize that fact.

When the communicative connection with the keyboard 30 is not established even in a case where the placement of the keyboard 30 on the second screen region DA2 is detected, the control unit 18 may further perform a display information control process of displaying the operable pop-up screen P2 (refer to FIG. 9) on which a user can perform an operation of giving a communicative connection with the keyboard 30 on the display 150.

As a result, in the information processing apparatus 10, when the keyboard 30 is placed in the second screen region DA2 but the communicative connection with the keyboard 30 is not established, a user can easily give an instruction for a communicative connection with the keyboard 30.

For example, in a case where the pop-up screen is displayed through the display information control process, the control unit 18 displays the pop-up screen in the first screen region DA1 other than the second screen region DA2 in the screen region DA of the display 150 in the full-screen mode.

As a result, the information processing apparatus 10 can display the pop-up screen at a position where the pop-up screen is not hidden by the keyboard 30 even if the keyboard 30 is placed on the second screen region DA2. Therefore, the information processing apparatus 10 can display a pop-up screen to be visually recognized by the user.

The control unit 18 performs a communicative connection with the keyboard 30 wirelessly or by wire in the communication control process. For example, in a case of wireless communication, the control unit 18 may perform a communicative connection with the keyboard 30 by using Bluetooth (registered trademark). In the case of wired communication, the control unit 18 may perform a communicative connection with the keyboard 30 by using USB.

Consequently, the information processing apparatus 10 can appropriately control display on the display 150 in a case of using the external keyboard 30 with which a communicative connection is established according to various methods.

The control unit 18 controls the second screen region DA2 to be displayed black in a case where a display mode is controlled to be switched to the half-screen mode in the display mode control process.

Consequently, when the information processing apparatus 10 is controlled to switch to the half-screen mode, the screen region on which the external keyboard 30 is placed can be set as a region for which display is invalid.

The control method in the information processing apparatus 10 according to the first embodiment includes causing the control unit 18 (an example of a processor such as a CPU, a GPU, or a microcomputer) to execute a placement detection step of detecting placement of the external keyboard 30 on the second screen region DA2 (an example of a predetermined screen region) in the screen region DA of the display 150, a communication control step of performing a communicative connection with the keyboard 30, and a step of controlling switching between the full-screen mode (an example of a first display mode) and the half-screen mode (an example of a second display mode) on the basis of a detection result in the placement detection step and a control result in the communication control step. For example, the control method in the information processing apparatus 10 includes causing the control unit 18 to execute a step of, in a case where it is detected that the keyboard 30 is placed on the second screen region DA2 in the step of controlling switching to the full-screen mode, controlling switching to the half-screen mode (an example of a second display mode) on condition that a communicative connection with the keyboard 30 is established, and, when the communicative connection with the keyboard 30 is not established even in a case where the placement of the keyboard 30 on the second screen region DA2 is detected, controlling switching to the full-screen mode instead of controlling switching to the half-screen mode.

As a result, the information processing apparatus 10 switches to the half-screen mode not only in a case where the keyboard 30 is placed on the second screen region DA2 but also in a case where the communicative connection with the keyboard 30 is established, so that there is no situation in which the keyboard 30 cannot be used despite switching to the half-screen mode. Therefore, the information processing apparatus 10 can appropriately control display on the display 150 in a case where the external keyboard 30 is used.

Second Embodiment

Next, a second embodiment will be described.

Since a fundamental configuration of the information processing apparatus 10 according to the second embodiment is the same as the configuration described with reference to FIGS. 1 to 3, 5, and 10 in the first embodiment, the description thereof will be omitted. Here, characteristic processing of the second embodiment will be described.

Similar to the first embodiment described with reference to FIGS. 6 to 9, the information processing apparatus 10 according to the second embodiment controls transition to the half-screen mode on the basis of both the presence or absence of placement of the keyboard 30 on the second screen region DA2 and the presence or absence of a communicative connection with the keyboard 30, but the second embodiment is different from the first embodiment in terms of control of a display mode in a case where a pop-up screen is displayed when a communicative connection with the keyboard 30 is not established.

For example, when a communicative connection with the keyboard 30 is not established even in a case where placement of the keyboard 30 on the second screen region DA2 is detected, the control unit 18 temporarily controls switching to the half-screen mode and then displays the pop-up screen P1 (refer to FIG. 8) or the pop-up screen P2 (refer to FIG. 9) in the first screen region DA1. That is, in a case where placement of the keyboard 30 on the second screen region DA2 is detected, the control unit 18 temporarily controls switching to the half-screen mode regardless of the presence or absence of a communicative connection with the keyboard 30. When the communicative connection with the keyboard 30 is not established, the control unit 18 temporarily controls switching to the half-screen mode, and then displays the pop-up screen P1 (refer to FIG. 8) or the pop-up screen P2 (refer to FIG. 9) in the first screen region DA1. Thereafter, the control unit 18 may return a display mode from the half-screen mode to the full-screen mode after a certain period of time has elapsed in a state in which the communicative connection with the keyboard 30 is not established.

Figure 12:
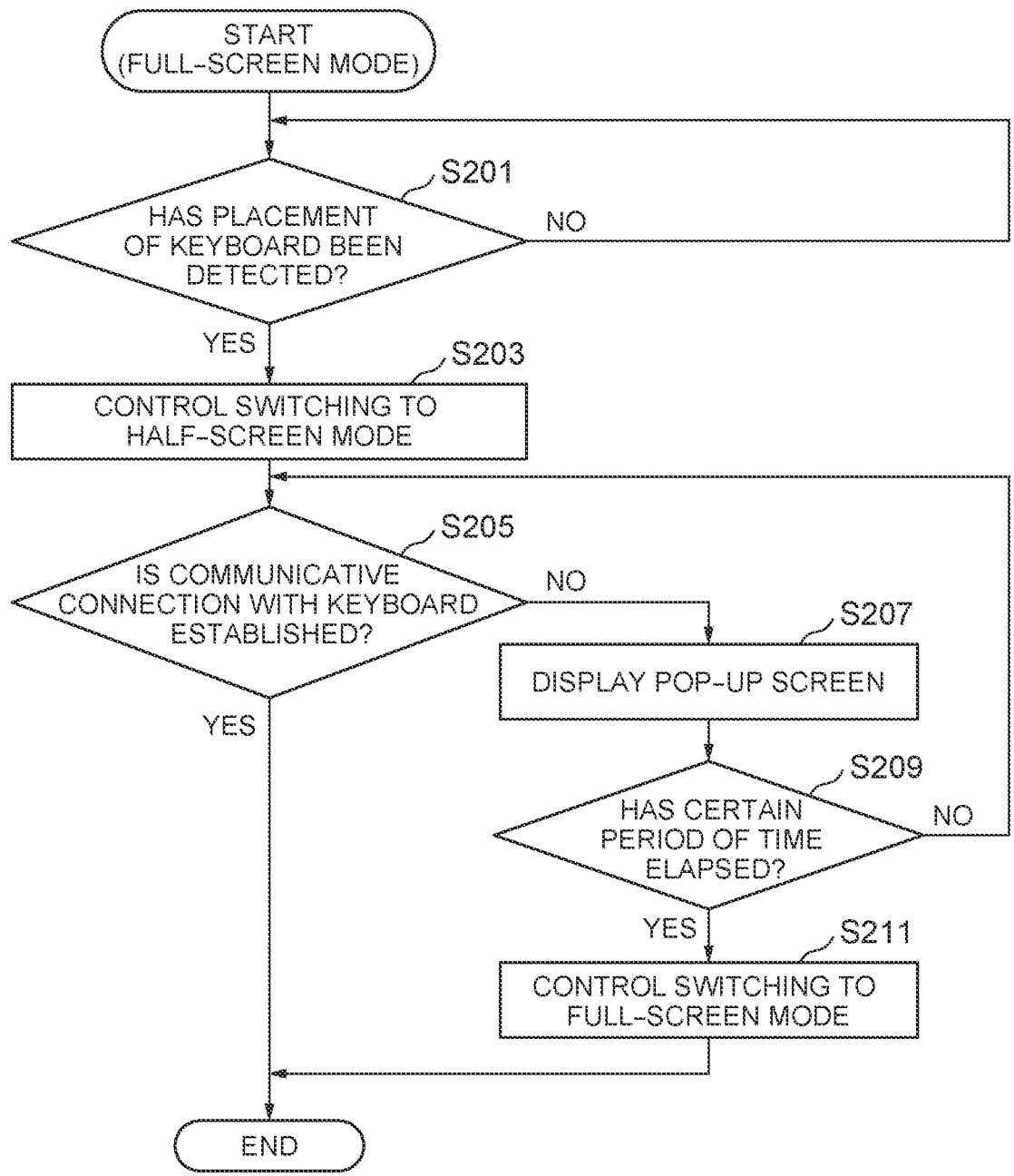
FIG. 12 is a flowchart illustrating an example of a half-screen mode control process according to a second embodiment.

FIG. 12 is a flowchart illustrating an example of a half-screen mode control process according to the second embodiment. Here, an operation in the control process in a case of switching the full-screen mode to the half-screen mode will be described.

(Step S201) The control unit 18 uses the hall sensor 17 to determine whether or not placement of the keyboard 30 on the second screen region DA2 in the screen region DA of the display 150 has been detected. In a case where the control unit 18 determines that the placement of the keyboard 30 has been detected (YES), the control unit 18 proceeds to the process in step S203. On the other hand, in a case where the control unit 18 determines that the placement of the keyboard 30 has not been detected (NO), the control unit 18 performs the process in step S201 again.

(Step S203) The control unit 18 controls to switch a display mode to the half-screen mode, and proceeds to the process in step S205.

(Step S205) The control unit 18 determines whether or not a communicative connection with the keyboard 30 is established via the communication unit 11. In a case where the control unit 18 determines that the communicative connection with the keyboard 30 is established (YES), the control unit 18 ends the process while maintaining control of switching to in the half-screen mode. On the other hand, in a case where the control unit 18 determines that the communicative connection with the keyboard 30 is not established (NO), the control unit 18 proceeds to the process in step S207.

(Step S207) The control unit 18 displays the pop-up screen P1 (refer to FIG. 8) or the pop-up screen P2 (refer to FIG. 9) in the first screen region DA1. The flow proceeds to the process in step S209.

(Step S209) The control unit 18 determines whether or not a certain time (for example, 30 seconds) has elapsed from the display of the pop-up screen P1 or the pop-up screen P2 in step S207. In a case where the control unit 18 determines that a certain time has not elapsed (NO), the control unit 18 returns to the process in step S205. On the other hand, in a case where the control unit 18 determines that a certain time has elapsed (YES), the control unit 18 proceeds to the process in step S211.

(Step S211) The control unit 18 hides the pop-up screen displayed in step S207 and controls to switch a display mode from the half-screen mode to the full-screen mode.

The control unit 18 may control switching to the half-screen mode in a case where the communicative connection with the keyboard 30 is established after returning to the full-screen mode in step S211. In a case where the control unit 18 detects a state in which the keyboard 30 is not placed on the second screen region DA2 after returning to the full-screen mode in step S211, the control unit 18 may return the process in step S201 and start the half-screen mode control process again.

In a case where the pop-up screen is displayed in step S207 and then the communicative connection with the keyboard 30 is established in step S205, the control unit 18 may hide the pop-up screen and end the process in the half-screen mode. In a case where a state in which the keyboard 30 is not placed on the second screen region DA2 is detected after the pop-up screen is displayed in step S207 and before a communicative connection with the keyboard 30 is established, the control unit 18 may hide the pop-up screen, return a display mode to the full-screen mode, and return to the process in step S201.

As described above, in the information processing apparatus 10 according to the second embodiment, when a communicative connection with the keyboard 30 is not established even in the case where placement of the keyboard 30 on the second screen region DA2 is detected, the control unit 18 controls switching to the half-screen mode (an example of a second display mode) through the display mode control process, and then displays the pop-up screen through the display information control process. After a certain period of time elapses from a state in which the communicative connection with the keyboard 30 is not established, the control unit 18 switches a display mode to the full-screen mode (an example of a first display mode) through the display mode control process.

As a result, the information processing apparatus 10 can easily control to display the pop-up screen in a screen region other than the screen region on which the keyboard 30 is placed by temporarily switching to the half-screen mode, as compared with the case of the full-screen mode. For example, in a case of establishing a communicative connection with the keyboard 30 by using Bluetooth (registered trademark), it is difficult for an OS to control a display position of the pop-up screen P2 (swift pair) as shown in FIG. 9 in the full-screen mode. In the half-screen mode, since only the first screen region DA1 is a display region, it is possible to display a pop-up screen in a screen region other than the screen region on which the keyboard 30 is placed without performing special control.

By temporarily transitioning to the half screen, a user can easily ascertain that the information processing apparatus 10 has correctly detected placement of the keyboard 30 (that is, a placement mechanism has not failed).

Although the embodiments of the present invention have been described in detail with reference to the drawings above, a specific configuration is not limited to the above-described configuration, and various design changes and the like can be made without departing from the concept of the present invention. For example, the configurations described in each of the above embodiments may be freely combined.

In the above embodiments, an example has been described in which by default in the two-screen mode, the first screen region DA1 is used as a primary screen and the second screen region DA2 is used as a secondary screen, and in the inverted two-screen mode, the second screen region DA2 is used as a primary screen and the first screen region DA1 is used as a secondary screen, but a correspondence relationship between the primary screen and the secondary screen may be reversed. That is, by default in the two-screen mode, the second screen region DA2 may be used as a primary screen and the first screen region DA1 may be used as a secondary screen, and in the inverted two-screen mode, the first screen region DA1 may be used as a primary screen and the second screen region DA2 may be used as a secondary screen.

In the above-described embodiments, the example of the one-screen mode in which the screen region of the display 150 is controlled to be displayed as one screen region DA and the two-screen mode in which the screen region is divided into two screen regions such as the first screen region DA1 and the second screen region DA2 has been described, but in a case where the screen region of the display 150 is divided, the present invention is not limited to dividing the screen region into two screen regions, and the screen region may be divided into three or more screen regions. For example, even in a case of a three-screen mode in which the screen region of the display 150 is divided into three screen regions and display is controlled, display data to be displayed in each of the three screen regions does not have to be replaced and a display orientation of each of the three screen regions may be changed according to rotation of the display 150.

The external keyboard 30 that can be placed on the screen of the display 150 is not limited to one that substantially matches the size of the second screen region DA2 divided in half in the two-screen mode, and, for example, a size thereof may be smaller than the size of the second screen region DA2. A position where the keyboard 30 is placed may be not only a position where the lower side of the keyboard 30 coincides with the lower side of the second screen region DA2, but also a position where the upper side of the keyboard 30 coincides with the upper side of the second screen region DA2 or an intermediate position.

In the above embodiments, the example in which one foldable display 150 is used in the one-screen mode and the two-screen mode has been described, but a plurality of (for example, two) displays may be used. For example, a one-screen mode in which respective screen regions (screen regions) of the two displays are controlled to be combined and displayed as a screen region (screen region) and a two-screen mode in which display of each screen region (screen region) of the two displays is individually controlled may be used. The processing in each of the above embodiments may be applied as a half-screen mode in which only one of the two displays is targeted for display and the other is controlled to be displayed black or not to be displayed.

In the above embodiments, an example of a touch operation on a plurality of touch panel type displays in which an input unit (touch sensor) and a display unit are integrally configured has been described, but the present invention is limited to the touch operation, and a click operation using a mouse, an operation using a gesture, or the like may be performed.

The information processing apparatus 10 described above has a computer system inside. The process in each configuration of the information processing apparatus 10 described above may be performed by recording a program for realizing the functions of each configuration included in the above-described information processing apparatus 10 and reading and executing the program recorded on the recording medium with a computer system. Here, "reading and executing the program recorded on the recording medium with the computer system" includes installing the program in the computer system. The term "computer system" as stated herein includes hardware such as an OS and peripheral devices. The "computer system" may include a plurality of computer devices connected via a network including a communication line such as the Internet, a WAN, a LAN, and a dedicated line. The "computer-readable recording medium" is a portable medium such as a flexible disk, a magneto-optical disk, a ROM, or a CD-ROM, and a storage device such as a hard disk built into the computer system. As described above, the recording medium that stores the program may be a non-transitory recording medium such as a CD-ROM.

The recording medium also includes an internal or external recording medium accessible from a distribution server in order to distribute the program. The program may be divided into a plurality of programs, downloaded at different timings, and then combined with each configuration included in the information processing apparatus 10, or distribution servers for distributing the respective divided programs may be different. The "computer-readable recording medium" includes a medium that stores the program for a certain period of time, such as a volatile memory (RAM) inside a computer system that serves as a server or a client in a case where the program is transmitted via a network. The above program may be a program for realizing some of the above functions. The program may be a so-called difference file (difference program) in which the above functions can be realized in combination with a program already recorded in the computer system.

Some or all of the functions of the information processing apparatus 10 in the above-described embodiments may be realized by an integrated circuit such as a large scale integration (LSI). Each function may be individually realized as a processor, and some or all of the functions may be integrated into a processor. A method of forming an integrated circuit is not limited to the LSI, and may be realized by a dedicated circuit or a general-purpose processor. In a case where an integrated circuit technology that replaces an LSI will appear due to advances in semiconductor technology, an integrated circuit based on the technology may be used.

DESCRIPTION OF SYMBOLS

10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
181 communication control unit
182 keyboard detection processing unit
183 placement detection portion
184 communicative connection determination portion
185 display mode control unit
186 display information control unit

What is claimed:

1. An information processing apparatus comprising:
a display;
a memory that temporarily stores display data to be displayed on the display; and
a processor that performs control when the display data stored in the memory is displayed on the display, wherein
the processor performs
a placement detection process of detecting placement of an external keyboard on a predetermined screen region in a screen region of the display,
a communication control process of performing a communicative connection with the keyboard, and
a display mode control process of controlling switching between a first display mode and a second display mode on the basis of the placement detection process and the communication control process, the first display mode being a display mode in which the entire screen region of the display is controlled to be displayed as a display region, and the second display mode being a display mode in which a partial screen region of the display excluding the predetermined screen region in the screen region of the display is controlled to be displayed as a display region;

wherein in the display mode control process, the processor controls switching to the second display mode in a case where the placement of the keyboard on the predetermined screen region is detected on condition that the communicative connection with the keyboard is established, and controls Switching to the first display mode instead of switching to the second display mode when the communicative connection with the keyboard is not established even in a case where the placement of the keyboard on the predetermined screen region is detected.

2. The information processing apparatus according to claim 1, wherein in the display mode control process, the processor controls switching to the first display mode in a case where the placement of the keyboard on the predetermined screen region is not detected.

3. The information processing apparatus according to claim 1, wherein the processor further performs a display information control process of displaying, on the display, a pop-up screen including information indicating that the communicative connection with the keyboard is not established when the communicative connection with the keyboard is not established even in a case where the placement of the keyboard on the predetermined screen region is detected.

4. The information processing apparatus according to claim 2, wherein in a case where the pop-up screen is displayed through the display information control process, the processor displays the pop-up screen in a screen region other than the predetermined screen region in the screen region of the display in the first display mode.

5. The information processing apparatus according to claim 1, wherein the processor further performs a display information control process of displaying, on the display, a pop-up screen on which a user is allowed to perform an operation of giving an instruction for the communicative connection with the keyboard when the communicative connection with the keyboard is not established even in a case where the placement of the keyboard on the predetermined screen region is detected.

6. The information processing apparatus according to claim 1, wherein in the communication control process, the processor performs the communicative connection with the keyboard wirelessly or by wire.

7. The information processing apparatus according to claim 1, wherein in a case where the processor controls switching to the second display mode through the display mode control process, the processor controls to display the predetermined screen region black.

8. The information processing apparatus according to claim 1, wherein the display is one foldable display.

9. The information processing apparatus according to claim 1, wherein the display includes a plurality of displays.

10. A control method in an information processing apparatus including a display, a memory that temporarily stores display data to be displayed on the display, and a processor that performs control when the display data stored in the memory is displayed on the display, the control method comprising:

causing the processor to execute a placement detection step of detecting placement of an external keyboard on a predetermined screen region in a screen region of the display, a communication control step of performing a communicative connection with the keyboard, and a step of controlling switching between a first display mode and a second display mode on the basis of a detection result in the placement detection step and a control result in the communication control step, the first display mode being a display mode in which the entire screen region of the display is controlled to be displayed as a display region, and the second display mode being a display mode in which a partial screen region excluding the predetermined screen region in the screen region of the display is controlled to be displayed as a display region;

wherein in the step of controlling switching, the processor controls switching to the second display mode in a case where the placement of the keyboard on the predetermined screen region is detected on condition that the communicative connection with the keyboard is established, and controls switching to the first display mode instead of switching to the second display mode when the communicative connection with the keyboard is not established even in a case where the placement of the keyboard on the predetermined screen region is detected.

* * * * *